United States Patent [19]

Keller et al.

[11] Patent Number: 5,725,822
[45] Date of Patent: Mar. 10, 1998

[54] EXTRUSION OF ELECTRODE MATERIAL BY LIQUID INJECTION INTO EXTRUDER BARREL

[75] Inventors: David Gerard Keller, Baltimore; Richard Thomas Giovannoni, Reisterstown; Kenneth Orville MacFadden, Highland, all of Md.

[73] Assignee: W. R. Grace & Co.-Conn., New York, N.Y.

[21] Appl. No.: 653,174

[22] Filed: May 24, 1996

[51] Int. Cl.$^6$ .................................................. B29C 47/10
[52] U.S. Cl. ............................................... 264/211.11
[58] Field of Search ..................................... 264/211.11

[56] References Cited

U.S. PATENT DOCUMENTS

| | | | |
|---|---|---|---|
| 4,818,643 | 4/1989 | Cook et al. | 429/188 |
| 4,859,068 | 8/1989 | Sironi | 366/76 |
| 5,190,711 | 3/1993 | Blemberg | 264/171 |
| 5,316,556 | 5/1994 | Morris | 264/211.11 |

*Primary Examiner*—Thomas R. Weber
*Attorney, Agent, or Firm*—Howard J. Troffkin

[57] ABSTRACT

An electrode sheet product is formed using an extruder having a feed throat and a downstream section by separately mixing an active electrode material and a solid polymer electrolyte composition that contains lithium salt. The active electrode material is fed into the feed throat of the extruder, while a portion of at least one fluid component of the solid polymer electrolyte composition is introduced to the downstream section. The active electrode material and the solid polymer electrolyte composition are compounded in a downstream end of the extruder. The extruded sheets, adhered to current collectors, can be formed into battery cells.

14 Claims, 1 Drawing Sheet

5,725,822

1

EXTRUSION OF ELECTRODE MATERIAL BY LIQUID INJECTION INTO EXTRUDER BARREL

This invention was made with Government support under Contract DE-FC02-91CE50336 awarded by the United States Department of Energy. The Government has certain rights in this invention.

BACKGROUND OF THE INVENTION

1. Field of the Invention

The present invention relates to a continuous process for forming a solid polymer electrolyte-electrode composite. The process generally involves forming an electrode by extrusion of an active electrode material mixed with a solid polymer electrolyte composition.

2. Description of the Related Art

Storage batteries have a configuration composed of at least one pair of electrodes of opposite polarity, generally arranged in a series of adjacent electrodes of alternating polarity. The current flow between electrodes is maintained by an electrolyte composition capable of carrying ions between electrode pairs.

Non-aqueous batteries have certain distinct advantages over other types of storage batteries. They use light-weight metals, such as the alkali metals, as, for example, lithium. The metals are preferably in forms that are capable of intercalating ions within the structure of the active material used, preferably carbon. Typical metals and metal compounds include alkali metals and alkali metal compounds, such as lithium metal, lithium oxide, lithium-aluminum alloys and the like, which are at the far end of the electromotive series. These batteries have the potential for providing much higher specific (gravimetric) energy and volumetric energy densities (capacity per unit weight and volume, respectively) than other types of batteries.

The improved potential, in part, is due to the low atomic weight of the metals utilized, and the high potential for forming a battery in conjunction with suitable positive electrodes far removed in the electromotive series from the light weight metal (alkali metal) electrode. The battery can be formed in any conventional physical design, such as cylindrical, rectangular or disc-shaped "button" cells, normally of a closed cell configuration.

The battery components include positive electrodes, negative electrodes, and an insulating material capable of permitting ionic conductivity such as a porous separator membrane or a solid polymer electrolyte located between the electrodes. Batteries formed of these components can be in the form of alternating plates in a sandwich design, or of a continuously spirally-wound "jelly-roll" design, as are well known.

Electrolytes useful in such high energy battery systems can be formed of a non-aqueous liquid alone or as part of a fused or solid (capable of sustaining its shape at ambient conditions) polymer electrolyte composition. Illustrative of known non-aqueous liquids include acetonitrile, tetrahydrofuran and its derivatives, ethylene carbonate, propylene carbonate, various sulfones and mixtures of these liquids. The electrolyte usually contains an appropriate, light-metal salt, such as the lithium salts described below.

Electrolytes in the form of a fused or solid electrolyte composition are known from U.S. Pat. No. 5,219,679 to Abraham et al., the disclosure of which is incorporated herein by reference. The electrolyte, described generally as a solid polymer electrolyte (SPE), is a polymer-non-aqueous liquid matrix in which ions are conducted and which contain an alkali metal ion, such as lithium ion ($Li^+$) exchange complexes.

The alkali-metal ion-exchange complexes utilize alkali metal (e.g. lithium) salts that are well known in the art of lithium battery production. The salts commonly used include, for example, $LiPF_6$, $LiAsF_6$, $LiCF_3SO_3$, and $LiClO_4$ and the like.

Liquids that have been utilized effectively in making the ion-exchange complexes of the SPE include the organic liquids, especially those that are aprotic, i.e., not prone to contributing a proton, such as ethylene carbonate, propylene carbonate, dimethyl carbonate, diethyl carbonate, dimethyl adipate, tetramethylene sulphone, λ-butyrolactone, dimethylformamide, dioctyl phthalate, and dibutyl phthalate and the like.

Polymers typically used in SPE's include polyacrylonitrile (PAN), poly(tetraethylene glycol diacrylate) (PEGDA), poly(vinylidene difluoride) (PVDF) and poly(vinyl pyrrolidone) (PVP) and the like.

The known solid polymer electrolytes typically have been used to make batteries by sandwiching the SPE's between a cathode and an anode, as shown, for example, in U.S. Pat. No. 4,818,643, issued to Cook et al., which is incorporated herein by reference. Therein, a solid polymer electrolyte is sandwiched between a composite cathode disc and a lithium metal anode. The composite cathode disc is pressed from a mixture of polyethylene oxide and active cathode material.

Both anodic and cathodic electrode materials have been formed from compositions composed of electrochemically active and electronically conductive materials which are bound together by the presence of an inert polymer (e.g. polyolefins, polytetra-fluoroethylene and the like). The polymer bonded electrodes are conventionally formed into porous structures which permit electrolyte material (such as electrolyte liquids) to enter the pores and aid in the ionic transfer.

As disclosed in a copending U.S. patent application 08/653,172, now pending, co-assigned with the present application and incorporated herein by reference, methods and battery compositions have been developed which provide a solid polymer electrolyte-electrode composite. Briefly, the process involves extruding electrode blends consisting of solid particulate composed of electrochemically active material and/or electrically conductive material (e.g. graphite or coke for anodes and a blend of lithium manganese oxide and electrically conductive material, such finely divided (submicron) carbon such as acetylene black for cathodes), and a solid polymer electrolyte components of polymer, salt and organic liquid capable of solvating the salt.

The first step in the electrode extrusion process is to mix the components of the solid polymer electrolyte with the active materials which are then fed to an extruder fitted with a sheet die to produce the desired electrode sheet.

The process is advantageous in providing a working electrode can be produced in a single-step extrusion process. Disadvantageously, however, processing of the desired electrode compositions can be limited by the material-handling capabilities of the extruder. Accordingly, the electrochemical characteristics of the electrodes produced can be varied only within the range that is dictated by the ability of the extruder to handle a given material mix.

In general, it is desirous to have a high loading of solid active material in the electrode composition. However, in the composite electrolyte-electrode, one usually desires a volume of solid polymer electrolyte components which, when subjected to extrusion processing conditions (e.g. elevated heat and pressure) transform into a fluid material. This resultant wet composition does not lend itself to be properly processed through a conventional extrusion devices.

Accordingly, the need exists for methods of producing battery electrodes which allow for greater flexibility in adjusting electrode compositions and processing with desired compositions.

SUMMARY OF THE INVENTION

The present invention provides a method of forming a solid polymer electrolyte-electrode composite by feeding the solid materials of an electrode composition to an upstream end of an extruder, and feeding at least a portion of the liquid components at a downstream position of the extruder. Preferably, the solids materials and a portion of the liquid components are introduced into the feed throat of the extruder and mixed in the extruder. Subsequently, additional liquid component or a mixture of such components is introduced to the extruder downstream to provide a highly filled composite product having the proper proportions of all materials.

DETAILED DESCRIPTION

Figure 1:
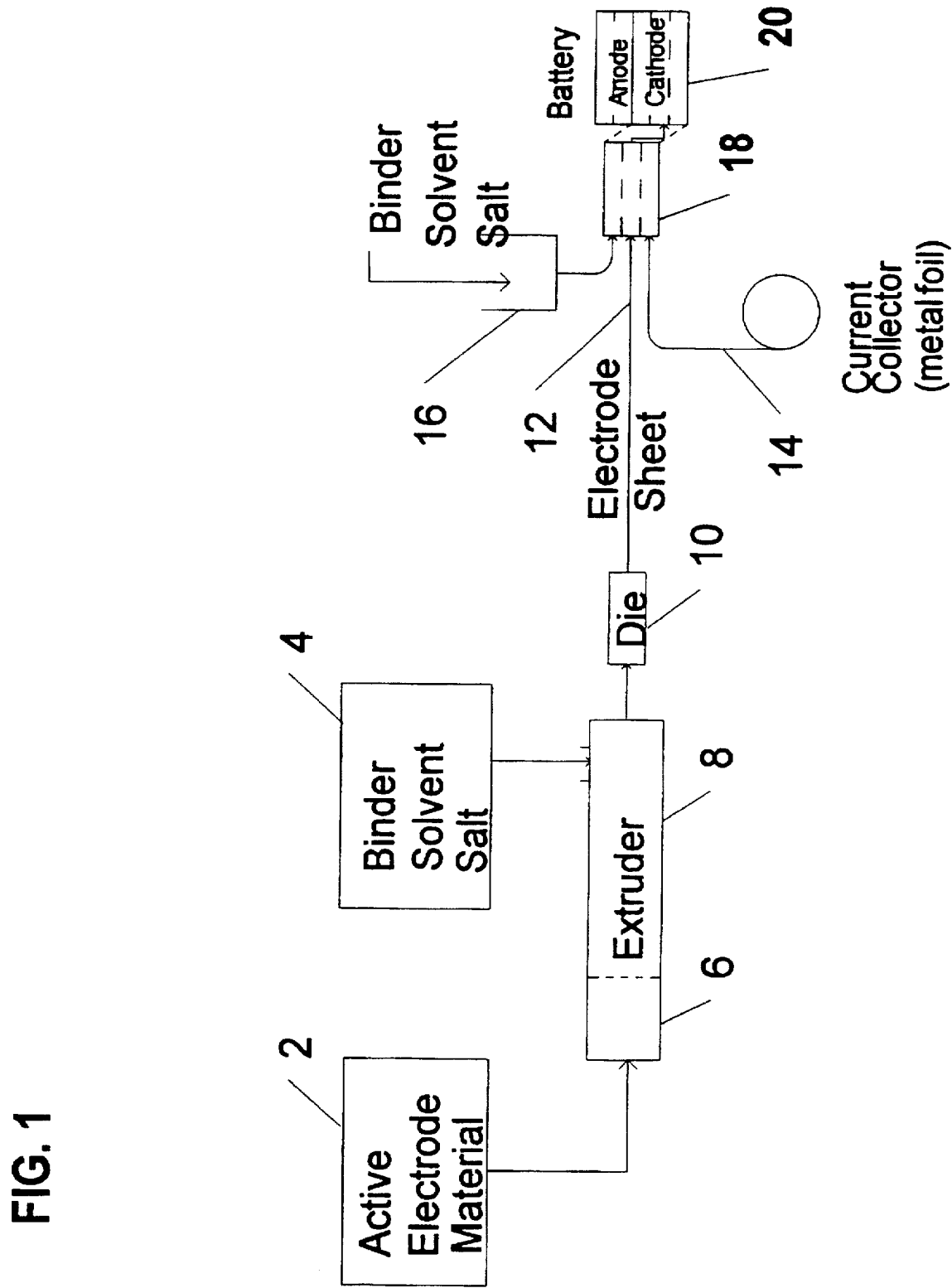
FIG. 1 is a block flow schematic of a process according to a preferred embodiment of the present invention.

The present process provides a unique manner of achieving a highly filled solid composite electrolyte-electrode product. The process provides a means of achieving higher loading and better processing by having mostly dry solid components introduced upstream in the extruder, and then adding at least a portion of the components which are fluid at extrusion operating conditions with better processing of the total composition. The present process has been found to permit higher solids loading in the extruder.

As disclosed in a co-pending U.S. patent application Ser. No. 08/653,172, now pending, which teaching is incorporated herein by reference, a substantially solid electrode-electrolyte composite product is formed in a one step extrusion process. The composite is composed of (a) solid particulate material composed of electrochemically active and/or electrically conductive materials, as appropriate for forming the desired cathode or anode electrode and (b) solid polymer electrolyte components composed of a polymer, salt and organic liquid(s) capable of solvating the salt to form an ionic complex within the solid polymer electrolyte Useful electrochemically active materials to provide a cathode are metal chalcogenides having a metal selected from Ti, Zr, Nb, Cu, Fe, Ta, V, Mn, C, Co, Ni and mixtures of these metals alone or together with intercalating metals, such as lithium or sodium. Preferred metal chalcogenides are alkali (e.g. lithium) salts of manganese oxides, cobalt oxides, vanadium oxide or nickel oxides or mixtures thereof. The most preferred chalcogenides are lithium manganese dioxide and overlithiated manganese oxides. The electrochemically active material is normally used in combination with minor amounts of up to about 30 wt. % of a conductive carbon based on the total solids. The conductive carbon may be a carbon black, such as acetylene block and usually has a particle size range of from about 1 to 100 μm.

The active material for forming anodes of the present invention are preferably conductive particulate materials (e.g. carbons) capable of having alkali metal (e.g. lithium) ions intercalated within the crystal or other structure of the material. The preferred forms of carbon include graphite or coke. The carbon is in a finely ground particulate state.

In addition to the electrochemically-electrically conductive material, the feed composition is composed of solid polymer electrolyte components of a polymer binder, liquid and salt. The polymer binder can be any solid polymer electrolyte binder component capable of withstanding (being stable with respect to) the extrusion processing conditions, in particular the temperature, pressure and shear conditions. The polymer binder may be, for example, polyacrylonitrile (PAN), polyvinylidene difluoride (PVDF), polyvinylpyrrolidone (PVP) and the like and copolymers thereof. The preferred polymers are PAN and PVDF, with the most preferred material being PAN having a weight average molecular weight of at least about 150,000 for cathodes and PVDF for anodes.

The liquid component of the feed can be any organic liquid capable of solvating the salt component and plasticizing the polymer binder. Such liquids include ethylene carbonate, propylene carbonate, including dimethyl carbonate, diethyl carbonate, dimethyl adipate, tetramethylene sulphone, λ-butyrolactone, dimethylformamide, dioctyl phthalate, and dibutyl phthalate, and the like and mixtures thereof. The preferred solvents are ethylene carbonate and propylene carbonate and most preferred are mixtures of ethylene carbonate and propylene carbonate in weight ratio of from 30:70 to 70:30 and most preferred in a 50:50 weight ratio.

The appropriate electrolyte alkali metal salts are added to the feed. Most preferably are the lithium salts, such as $LiPF_6$, $LiAsF_6$, $LiCF_3SO$, and $LiClO_4$ and the like.

According to the preferred process, the upstream portion of the extruder is used merely to mix the solid components with a small amount of electrolyte liquid component. The resulting mix, is then melted and further mixed with additional liquid(s) (e.g. EC/PC) to form a homogeneous end-product composite electrolyte-electrode.

As a result, less liquid is used at the beginning, and more liquid is added at the end. Advantageously, the material being conveyed into the extrusion feed throat is capable of having a higher active material load for the resultant composite formed. In addition, the present process provides better means of controlling the system contained in the extruder barrel, and provides better mixing and homogeneity by introducing liquid at a downstream end than in conventional processing.

The process includes the steps of mixing an active electrode material, and mixing separately a solid polymer electrolyte composition. Then, the active electrode material is fed into the feed throat of the extruder. The electrolyte composition is introduced to the downstream section. The solid active electrode material and the additional electrolyte are further compounded in a downstream end of the extruder.

The process of the present invention provides for the solid electrode materials to be initially introduced at the upstream feed part of the extruder. In addition to the solid electrode materials, the upstream feed can include a substantially dry mix of the solid polymer electrolyte components. For example, the upstream feed may include at least a portion of the design amount of the polymer of the electrolyte salt or mixtures thereof. Further, the upstream feed preferably contains a portion of the liquid component of the solid polymer electrolyte (e.g. from 20 to 70 weight % of the design amount required to form the final electrode-electrolyte composite. The resulting mix introduced at the upstream extruder feed throat has a high solid content which can be readily processed in the extruder to provide better mixing and homogeneity of the mixture.

The extruder must be fitted with a downstream port capable of introducing fluid material into the extruder barrel close to the extruder barrel. This downstream port can be located at any position but is preferably located close to the initial feed throat (e.g. in the next or next two zones downstream). The materials introduced at this downstream port are liquid components (e.g. liquid component(s) of the SPE alone or in combination with the remainder of the SPE's polymer, salt or both, as appropriate). If the components include SPE polymer, the material being introduced is preferably heated to an elevated temperature (e.g. 40° C.–150° C., preferably 70° C. to 120° C.) to provide a fluid mixture.

It has been unexpectedly found that by sequentially introducing first a high solid content feed mixture and then a substantially fluid feed into the extruder barrel one can achieve an extrusion process which permits a high solid active electrode-electrolyte composite design; permit the extrusion process to readily function; provide uniform mixing of the components; and to achieve a highly desired electrode-electrolyte composite by a single step extrusion technique.

According to the preferred process, the upstream portion of the extruder is used merely to mix the solid components with a small amount of SPE liquid component. The resulting mix is then mixed with additional SPE liquid to form the end product composite electrolyte-electrode.

The formed electrode has active electrode material, as described above, contained uniformly in a solid polymer electrolyte matrix. The matrix is composed of a polymer, a salt and a liquid capable of solvating and providing an ionic complex with the salt as fully described hereinabove.

The process can be used to formulate anodes or cathodes, depending on the active electrode material utilized. The anode material can include graphite or coke, for example, whereas the active cathode material preferably includes an alkali metal chalcogenide, most preferably lithium manganese oxide or overlithiated manganese oxide.

The compounded composition typically is extruded into a sheet which can be deposited onto a suitable current collector and then cut into smaller sizes to form electrodes. The electrodes can then be assembled into batteries.

Other features and advantages of the present invention will become apparent from the following description of the invention which refers to the accompanying drawing.

Referring to FIG. 1, the process of the present invention includes mixing active electrode materials in a first mixer 2 either alone or preferably with a portion of the components of the SPE, and separately mixing the remaining portion of the solid polymer electrolyte composition (preferably, a composition rich in liquid component) in a second mixer 4. The extruder used for forming the sheet product according to a preferred embodiment of the invention has a feed throat 6 and a downstream section 8.

The process includes feeding the materials from the first mixer 2 to the feed throat 6 at the upstream end of the extruder. This is a substantially solid particulate feed with a minor portion of the SPE liquid. Separately, the remaining design amount of solid polymer electrolyte composition is fed from second mixer 6 to the downstream section 8 of the extruder through a feed port associated therewith.

After the solid polymer electrolyte composition is introduced to the downstream section 8, the active electrode material and the solid polymer electrolyte composition have been found to readily compound in the downstream section of the extruder without separating or detracting from the extrusion process.

In a preferred embodiment, the electrolyte composition is a mix of polyacrylonitrile (PAN) with a liquid composed of a mixture of ethylene and propylene carbonates, and a lithium salt, such as $LiPF_6$ or lithium trifluoromethanesulfonamide.

Upon exiting the extruder, the composite mixture is formed into an electrode sheet by die 10. The extruded electrode sheet 12 may be deposited onto a current collector 14 which may be in the form of a metal sheet, scrim, screen or the like. The resultant electrode is ready to be assembled into a battery.

Optionally, electrode 18 can be further processed by coating a layer of a solid polymer electrolyte composition 16 onto at least one major surface of the electrode. This SPE composition preferably has a composition similar to that of the electrolyte composition used in the composite design.

Batteries 20 can be formed by pairing two opposite electrodes formed by the process above, one or both of the electrodes optionally being coated with the solid polymer electrolyte composition.

The present invention allows for solid loadings to be continuously produced. By adding the liquid downstream, an overly-wet slurry is avoided, the consistency of which is not amenable to extrusion.

The following examples are given for illustrative purposes only and are not meant to be a limitation on the invention, s defined by the appended claims. All parts and percentages are by weight unless otherwise stated.

EXAMPLE

A Berstorff ZE-25 co-rotating twin-screw extruder was used to pump the active material/SPE mixture to the sheet die. An Acrison screw feeder was used to feed the active material to the extruder feed throat 6, while a Luwa gear pump was used to feed a mixture of EC and PC (50:50) to the extruder barrel section 8 downstream of the feed throat. The polymer melt entered the sheet die 10 and expanded to the die width. The extrudate from the die was fed to the calender roll stack along with the substrate foil 14 (copper for anodes, aluminum for cathodes). The calendered composite was then wound onto spools by a windup roll.

Four extrusion runs I–IV were made, as described below:

The active materials used were UCAR 5 micron coke (anode); Davison $LiMn_2O_4$ (cathode, 86.3 wt %); and Shawinigan acetylene black (cathode, 13.7 wt %).

The SPE was formulated as follows: Eastern chemical PAN (6 wt %); Kodak lithium trifluoromethanesulfonamide (6 wt %); and Grant 1/1 PC/EC blend (88 wt %).

The extruder used was a co-rotating twin-screw extruder (Berstorff ZE-25) with seven heating zones, all set to 120° C.

The feeder used for the active material was an Acrison model BDFM-B/2 with 1.625" auger.

The SPE was pumped to the downstream section of the extruder using a Luwa model Cinox 22/6 with pumping capacity of 1 cc/rev.

Other data on the samples is given in the following table:

TABLE

|  | I | II | III | IV |
|---|---|---|---|---|
| Anode/cathode | anode | anode | anode | anode |
| Wt % active material | 58.0 | 60.6 | 63.2 | 71.0 |
| Vol % active material | 45.0 | 47.6 | 50.4 | 45.0 |
| Wt % SPE solvent injected | 42.0 | 39.4 | 36.8 | 29.0 |
| Extrusion rate, lb/hr | 20.0 | 21.3 | 22.8 | 25.0 |
| Extruder screw speed, rpm | 170 | 200 | 240 | 260 |
| Extruder pressure, psi | 150 | 550 | 1000 | 650 |
| Extruder melt temp, C. | 120 | 120 | 120 | 120 |
| Die width, inch | 4 | 4 | 4 | 4 |
| Die opening, mil | 10 | 10 | 10 | 25 |
| Die temp, C. | 116 | 116 | 116 | 120 |
| Extrudate width, inch | 4 | 4 | 4 | 4 |

Although the present invention has been described in relation to particular embodiments thereof, many other variations and modifications and other uses will become apparent to those skilled in the art. Therefore, the present invention is to be limited not by the specific disclosure herein, but only by the appended claims.

What is claimed is:

1. A process for forming an electrode sheet product using an extruder having a feed throat and a downstream section, the process comprising the steps of:
   mixing active electrode material;
   mixing an electrolyte composition;
   feeding the active electrode material to the extruder feed throat;
   introducing the solid polymer electrolyte composition to the downstream section;
   compounding the active electrode material and the solid polymer electrolyte composition in a downstream end of the extruder to provide a compounded compositions; and
   extruding the compounded composition into a desired shape.

2. The process of claim 1, wherein the step of mixing the solid polymer electrolyte composition includes the steps of adding a polymer, an organic liquid capable of solvating the lithium salt, and a lithium salt to form the composition.

3. The process of claim 2, wherein the lithium salt is selected from the group consisting of $LiPF_6$, $LiAsF_6$, $LiCF_3SO_3$, and $LiClO_4$.

4. The process of claim 2, wherein the solvent is a mixture of ethylene carbonate and propylene carbonate.

5. The process of claim 1, wherein the active electrode material is a solid conductive material capable of intercalating alkali metal ions therein.

6. The process of claim 5, wherein the active electrode material is selected from graphite or coke.

7. The process of claim 1, wherein the active electrode material is a cathode material.

8. The process of claim 7, wherein the cathode material includes lithium manganese oxide and overlithiated manganese oxides.

9. The process of claim 1, further comprising the step of forming the compounded composition into a sheet product.

10. The process of claim 1, wherein the polymer is selected from polyacrylonitrile or polyvinylidene difluoride.

11. The process of claim 1, wherein the solid polymer electrolyte composition is electrically non-conductive at all temperatures and ionically conductive.

12. A process for forming an electrode electrolyte composite composed of electrochemically active and/or electrically conductive materials and solid polymer electrolyte components of binder, salt and liquid, using an extruder having a feed throat and a downstream section, the process comprises the steps of:

i) introducing a first feed composition composed of solid particulate materials suitable for forming the electrode-electrolyte composite product into the extruder feed throat;

ii) mixing the introduced solid particulate materials within the extruder;

iii) introducing a second feed composition composed of a fluid composition of materials suitable for forming the electrode-electrolyte composite product into a downstream section of the extruder;

iv) mixing the solid materials and fluid composition to form a uniform composition; and v) extruding the uniform composition into a desired shape useful as an element of a battery.

13. The process of claim 12 wherein said first feed composition comprises solid electrochemically active and/or electrically conductive material and a portion of at least one component of a solid polymer electrolyte.

14. The process of claim 13 wherein the second feed composition comprises the remaining portions of the solid polymer electrolyte not introduced with the first feed.

* * * * *